(12) United States Patent
Connors

(10) Patent No.: US 11,465,802 B2
(45) Date of Patent: Oct. 11, 2022

(54) PALLET HAVING CURVED OPENINGS

(71) Applicant: REMCON PLASTICS INCORPORATED, Reading, PA (US)

(72) Inventor: Peter James Connors, Radnor, PA (US)

(73) Assignee: Remcon Plastics, Inc, Reading, PA (US)

( * ) Notice: Subject to any disclaimer, the term of this patent is extended or adjusted under 35 U.S.C. 154(b) by 142 days.

(21) Appl. No.: 16/974,080

(22) Filed: Sep. 23, 2020

(65) Prior Publication Data

US 2021/0170642 A1    Jun. 10, 2021

Related U.S. Application Data

(60) Continuation-in-part of application No. 16/873,161, filed on Feb. 18, 2020, now Pat. No. 10,786,931, which is a division of application No. 15/998,607, filed on Aug. 21, 2016, now Pat. No. 10,576,668.

(51) Int. Cl.
*B65D 19/00* (2006.01)

(52) U.S. Cl.
CPC ............ *B65D 19/0012* (2013.01); *B65D 2519/00069* (2013.01); *B65D 2519/00268* (2013.01); *B65D 2519/00288* (2013.01); *B65D 2519/00318* (2013.01)

(58) Field of Classification Search
CPC ...... B65D 19/0012; B65D 2519/00069; B65D 2519/00268; B65D 2519/00288; B65D 2519/00318
See application file for complete search history.

(56) References Cited

U.S. PATENT DOCUMENTS

| | | | |
|---|---|---|---|
| 5,579,686 A * | 12/1996 | Pigott | B65D 19/0012 108/56.1 |
| 6,508,182 B1 * | 1/2003 | Smorgan | B29C 45/26 108/57.25 |
| 6,874,428 B2 * | 4/2005 | Apps | B65D 19/0016 108/57.25 |
| 2003/0061974 A1 * | 4/2003 | Smyers | B65D 19/0012 108/57.33 |
| 2004/0149180 A1 * | 8/2004 | Apps | B65D 19/0012 108/57.25 |
| 2009/0114129 A1 * | 5/2009 | Smith | B29C 70/865 108/57.25 |

\* cited by examiner

*Primary Examiner* — Matthew W Ing
(74) *Attorney, Agent, or Firm* — Jonathan E. Grant; Grant Patent Services

(57) ABSTRACT

A pallet is taught having two openings on at least one side of the pallet, the two openings formed by a bisecting wall separating the openings. More specifically, at least one bisecting post creates a first opening and a second opening Each of the said first and second openings each have a convexly curved runner, said runner convexly curved along its width; and a concavely curved ceiling, said ceiling concavely curved along its width wherein the center point of the radius of the curved runner varies from the radius of the curved ceiling.

6 Claims, 17 Drawing Sheets

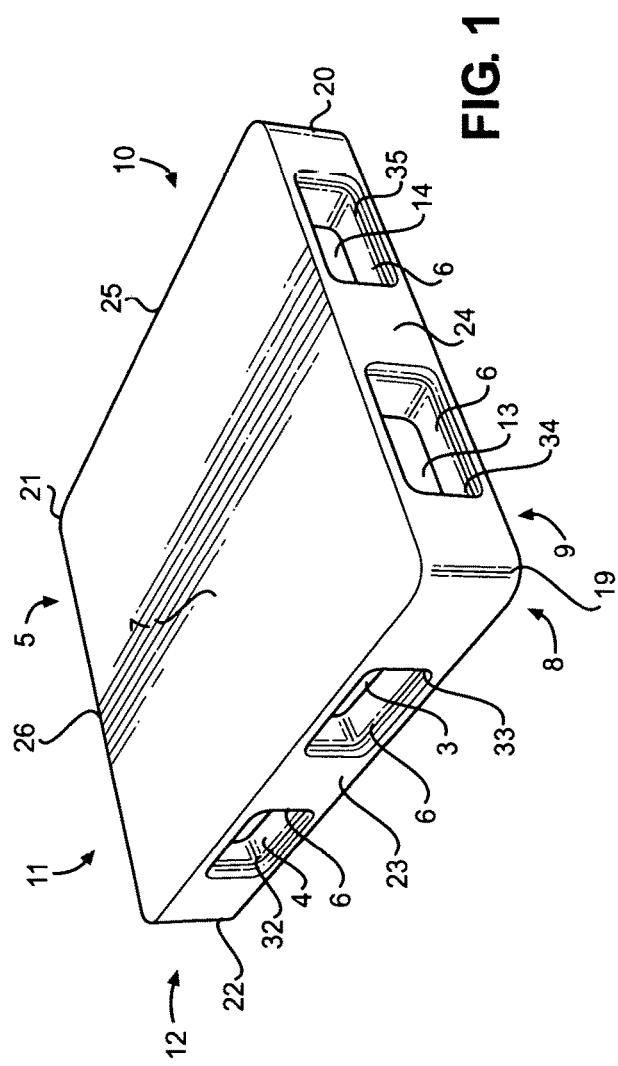
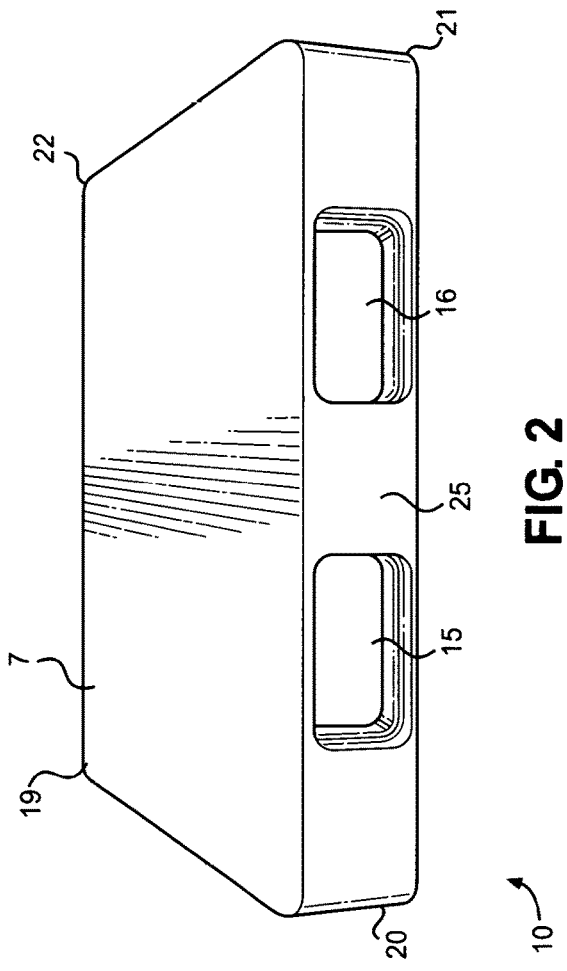

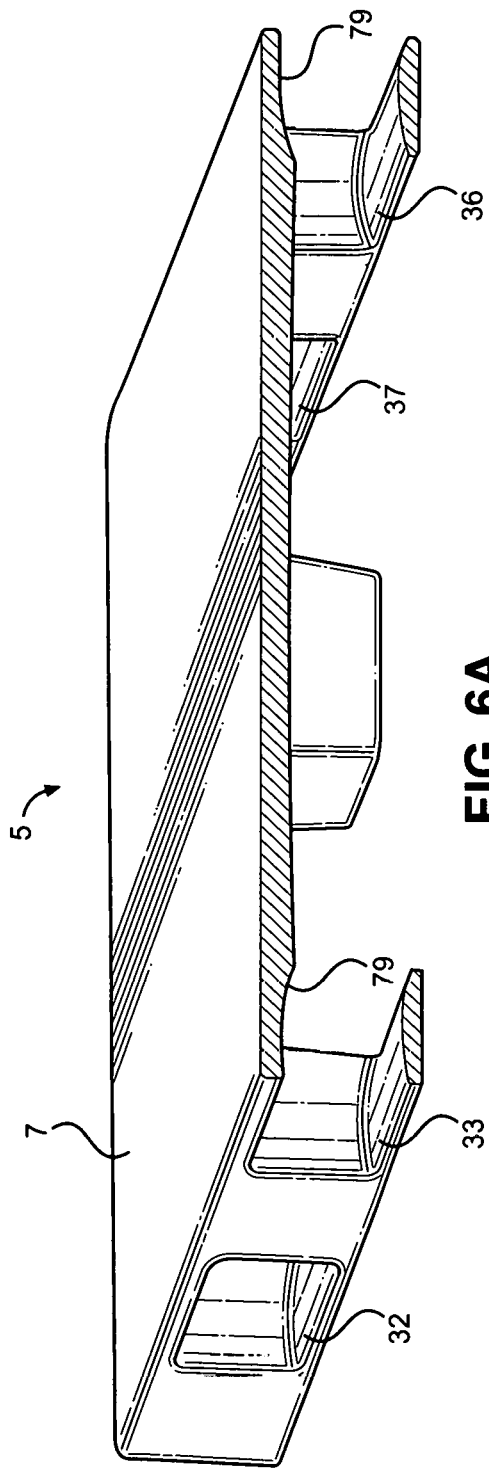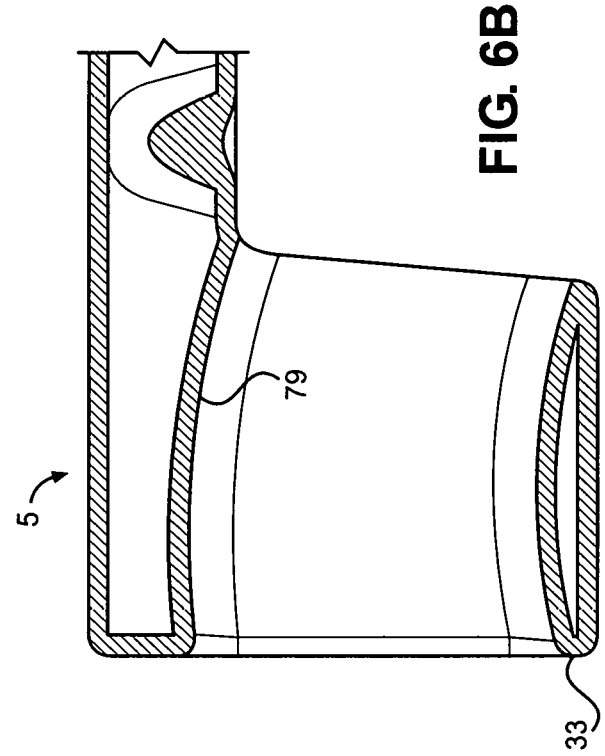

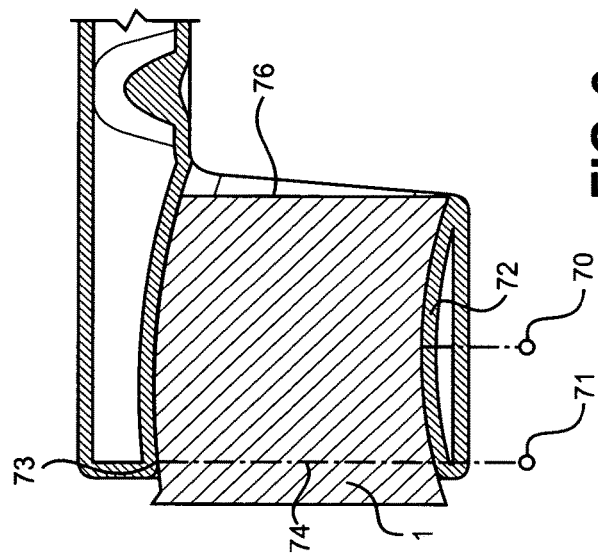
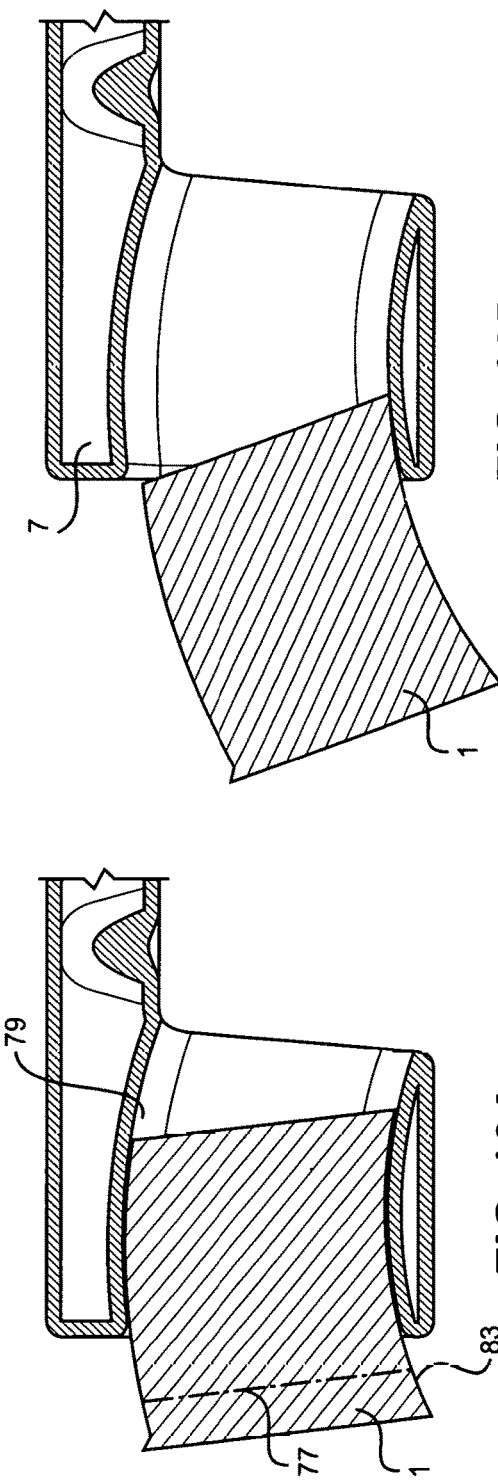

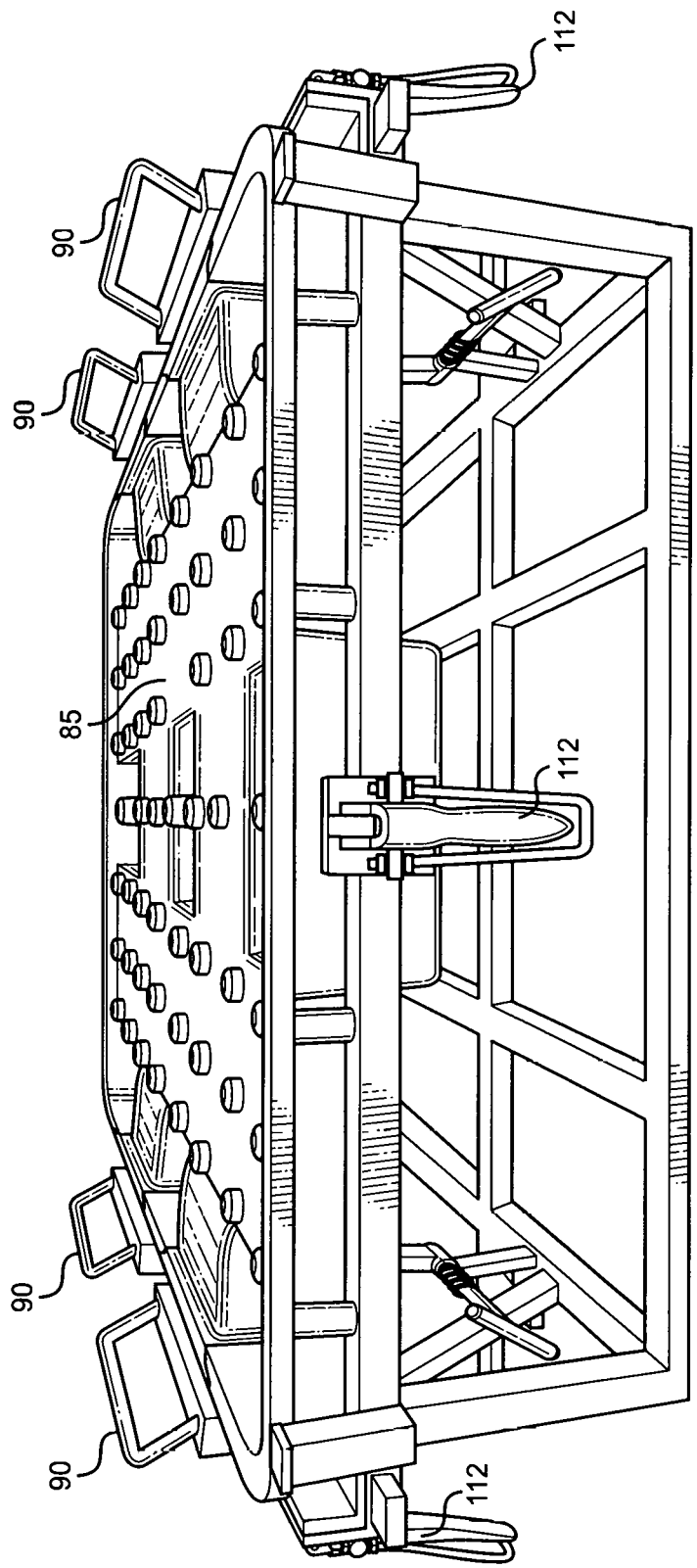

PALLET HAVING CURVED OPENINGS

This application is a continuation-in-part of U.S. application Ser. No. 16/873,161, filed Feb. 18, 2020, which is a division application of Ser. No. 15/998,607, filed Aug. 21, 2018, now U.S. Pat. No. 10,576,668, issued Mar. 3, 2020, all incorporated herein by reference in their entirety.

A mold core for a rotomold and a method of use for creating a curved opening in the rotomolding of a pallet is disclosed.

BRIEF DESCRIPTION OF THE FIGURES

FIG. 1 is a perspective view of a pallet;
FIG. 2 is a side view of the pallet of FIG. 1;
FIG. 6a is a perspective cutaway view showing the curvature of the angles of the pallet openings;
FIG. 6b is a cutaway side view of the pallet;
FIG. 9 is a side view showing the mold core inserted into the mold, as the plastic hardens around it;
FIG. 10A is a side view showing the mold core as it is being withdrawn from the opening formed by the mold;
FIG. 10B is a side view showing the mold core as it is further withdrawn from the opening formed by the mold;
FIG. 19 is a perspective view of an alternative embodiment of the mold.

Figure 3:
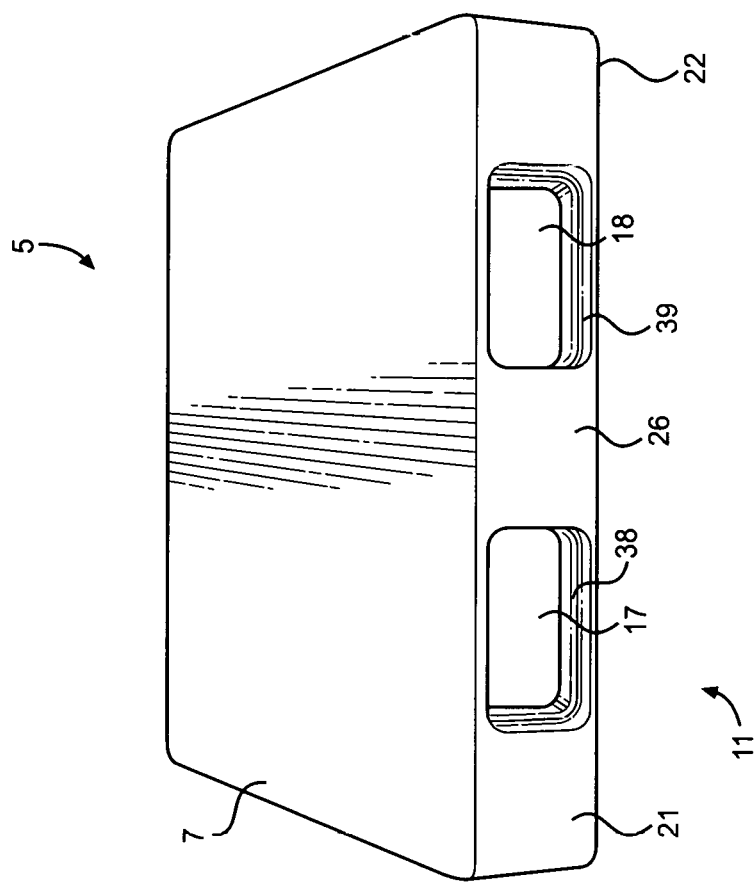
FIG. 3 is another side view of the pallet of FIG. 1.
Figure 4:
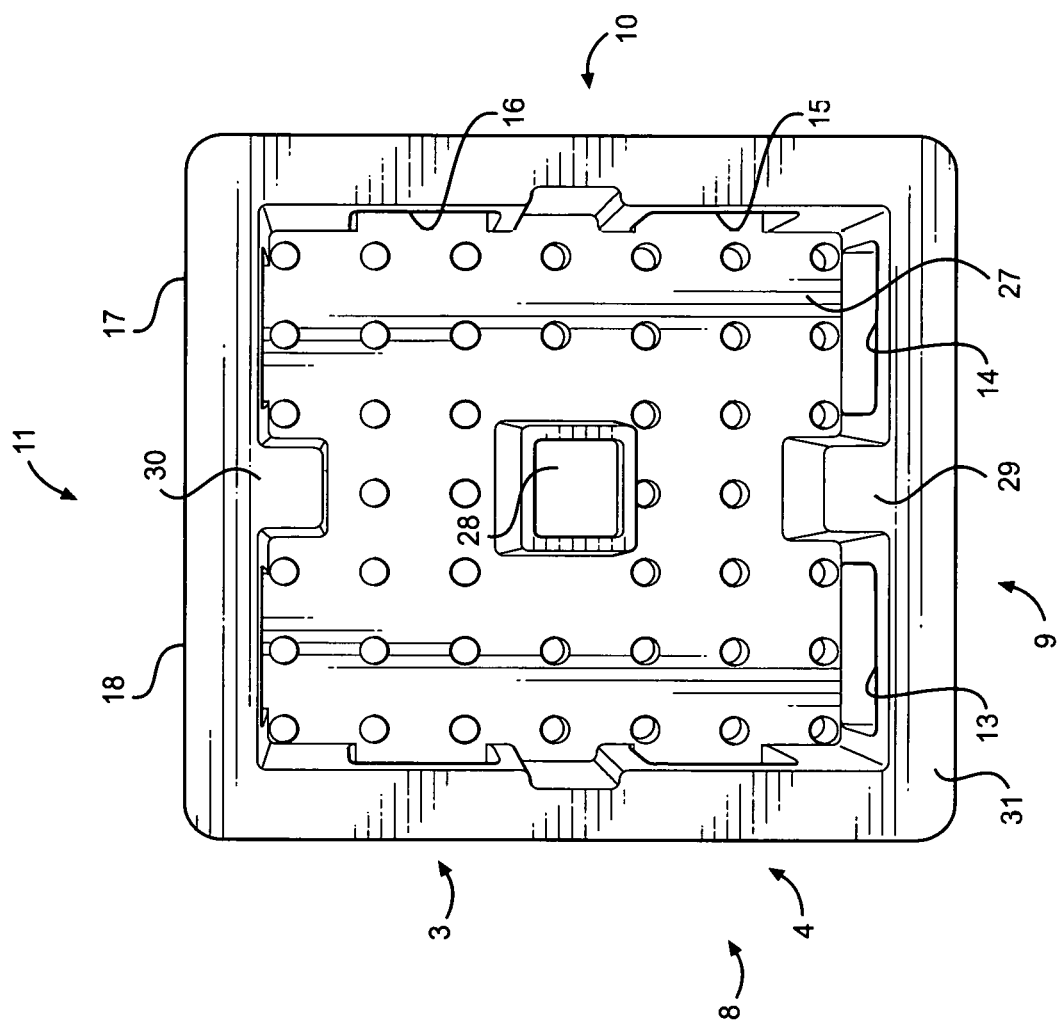
FIG. 4 is an underside view of the pallet of FIG. 1.
Figure 5:
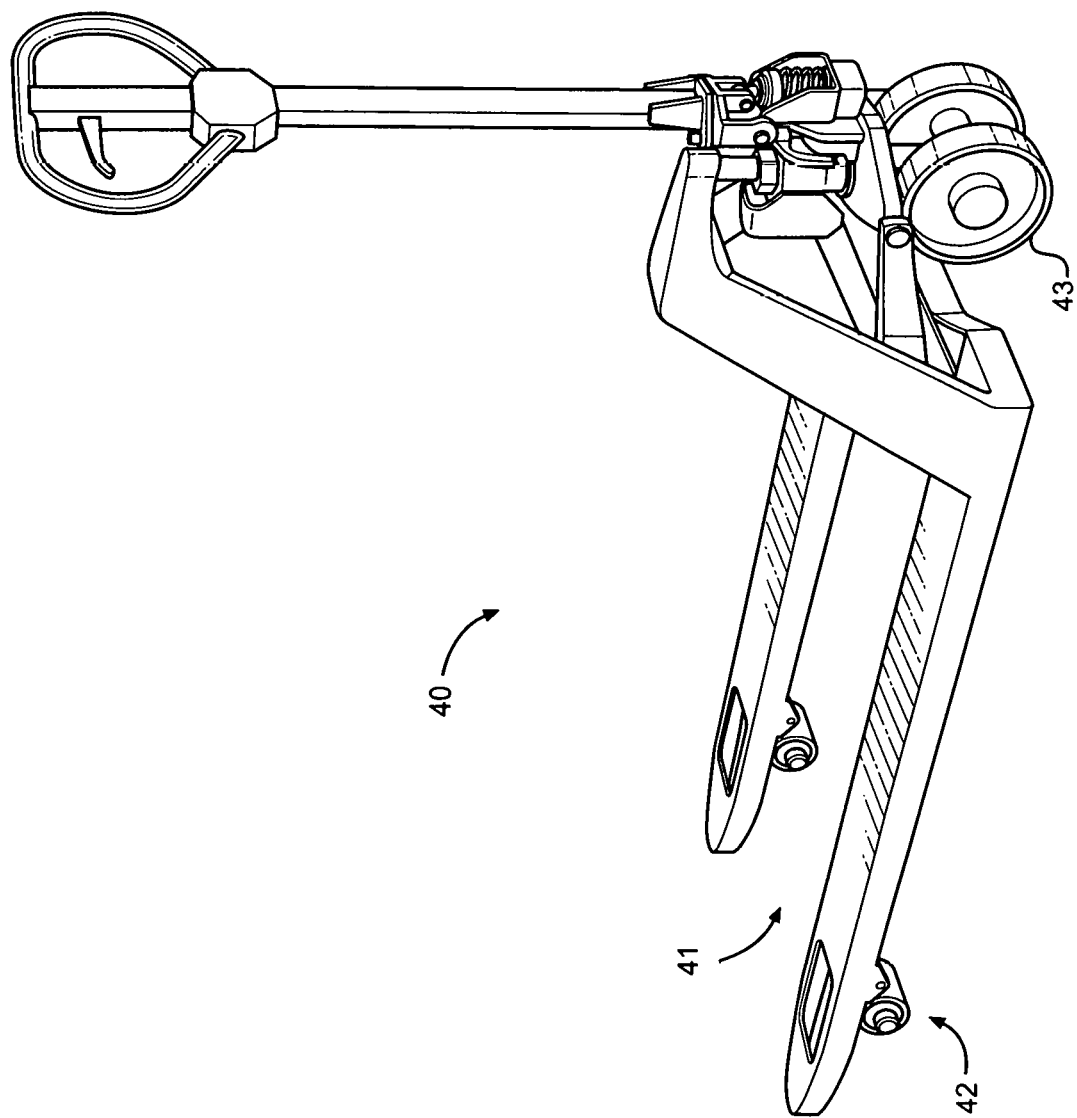
FIG. 5 is a pallet jack.
Figure 7:
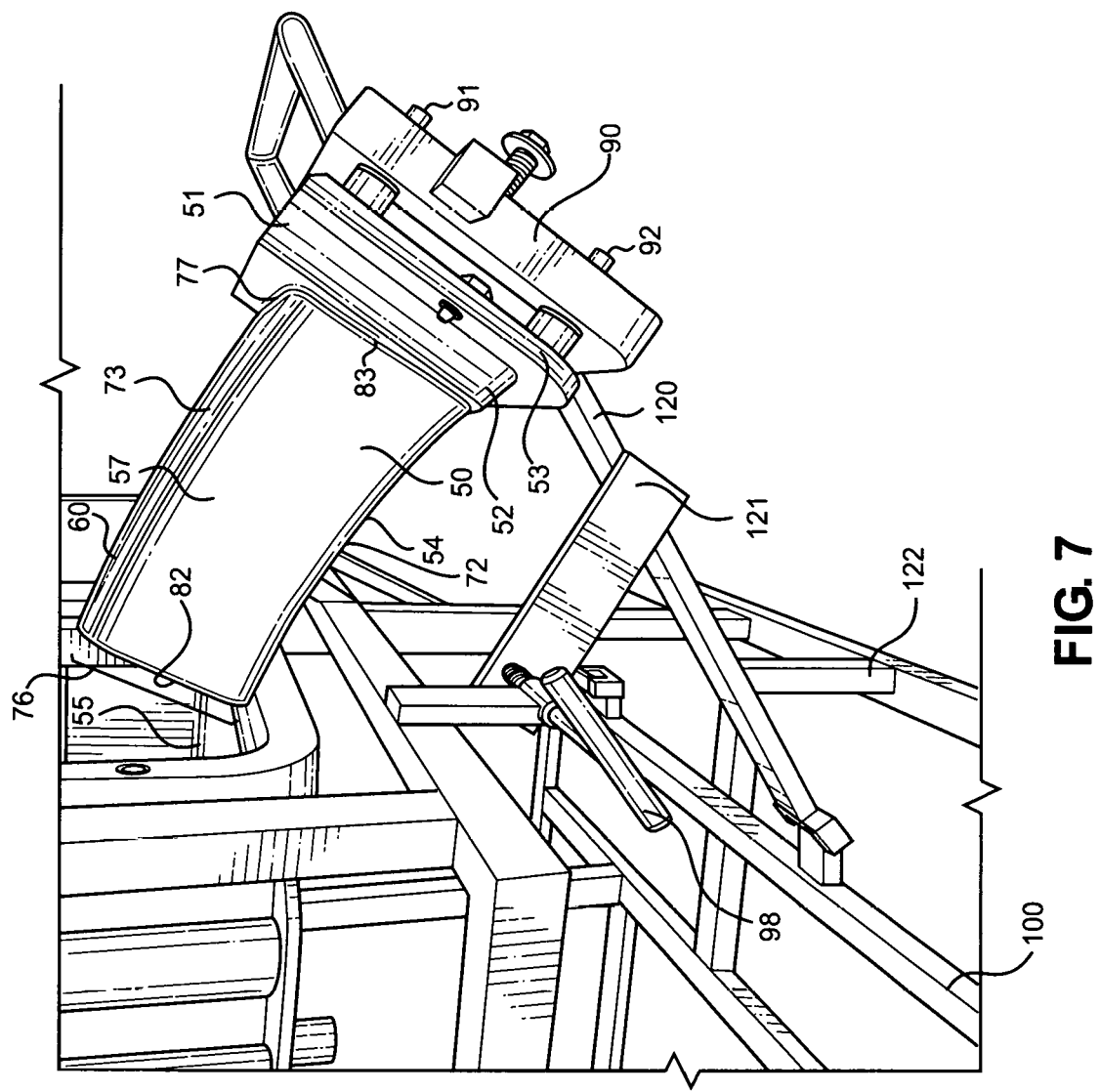
FIG. 7 is a side view of a mold core.
Figure 8:
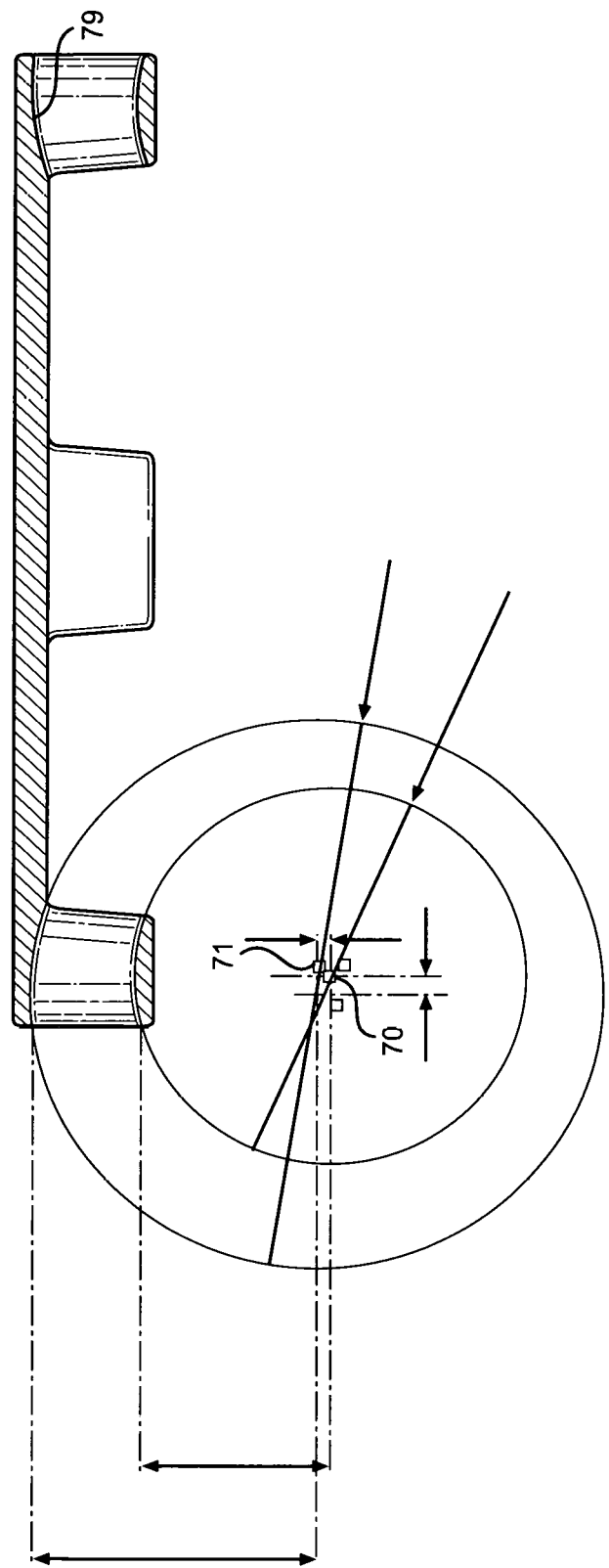
FIG. 8 is a figure showing the radius and noncentric circles that would be formed by the of the bottom section and top section of the mold core.
Figure 11:
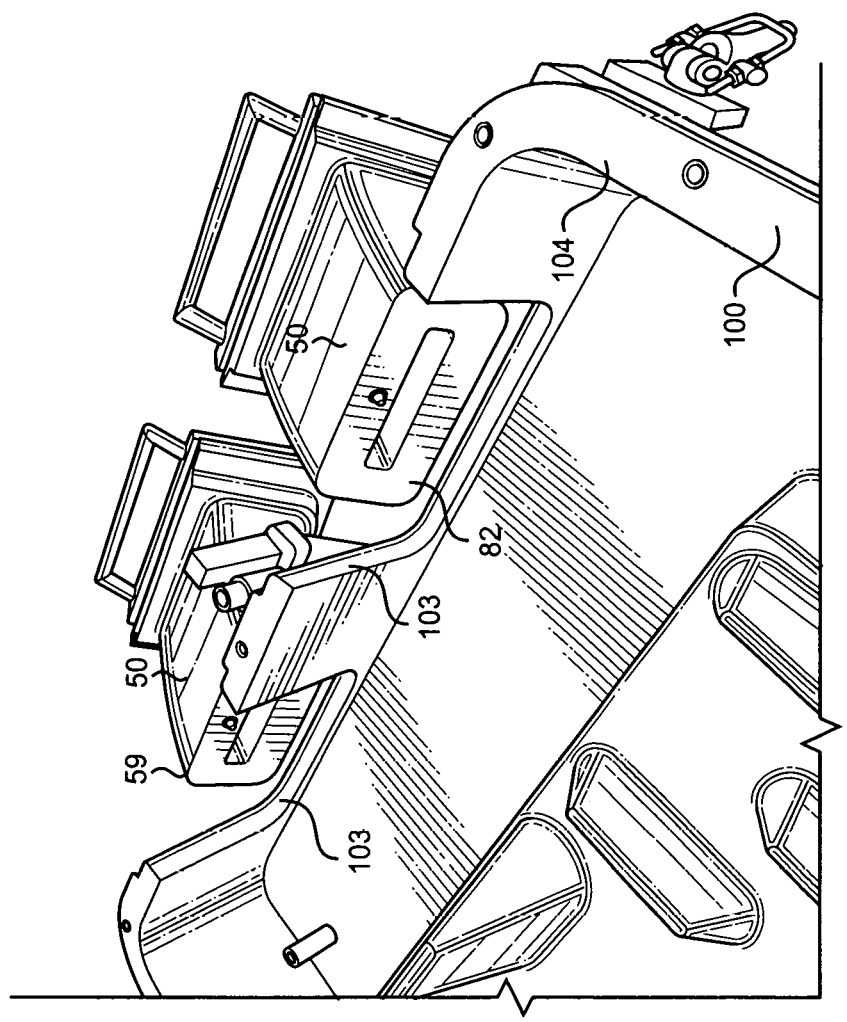
FIG. 11 is an overhead perspective view of two mold cores positioned before the openings of the central mold.
Figure 12:
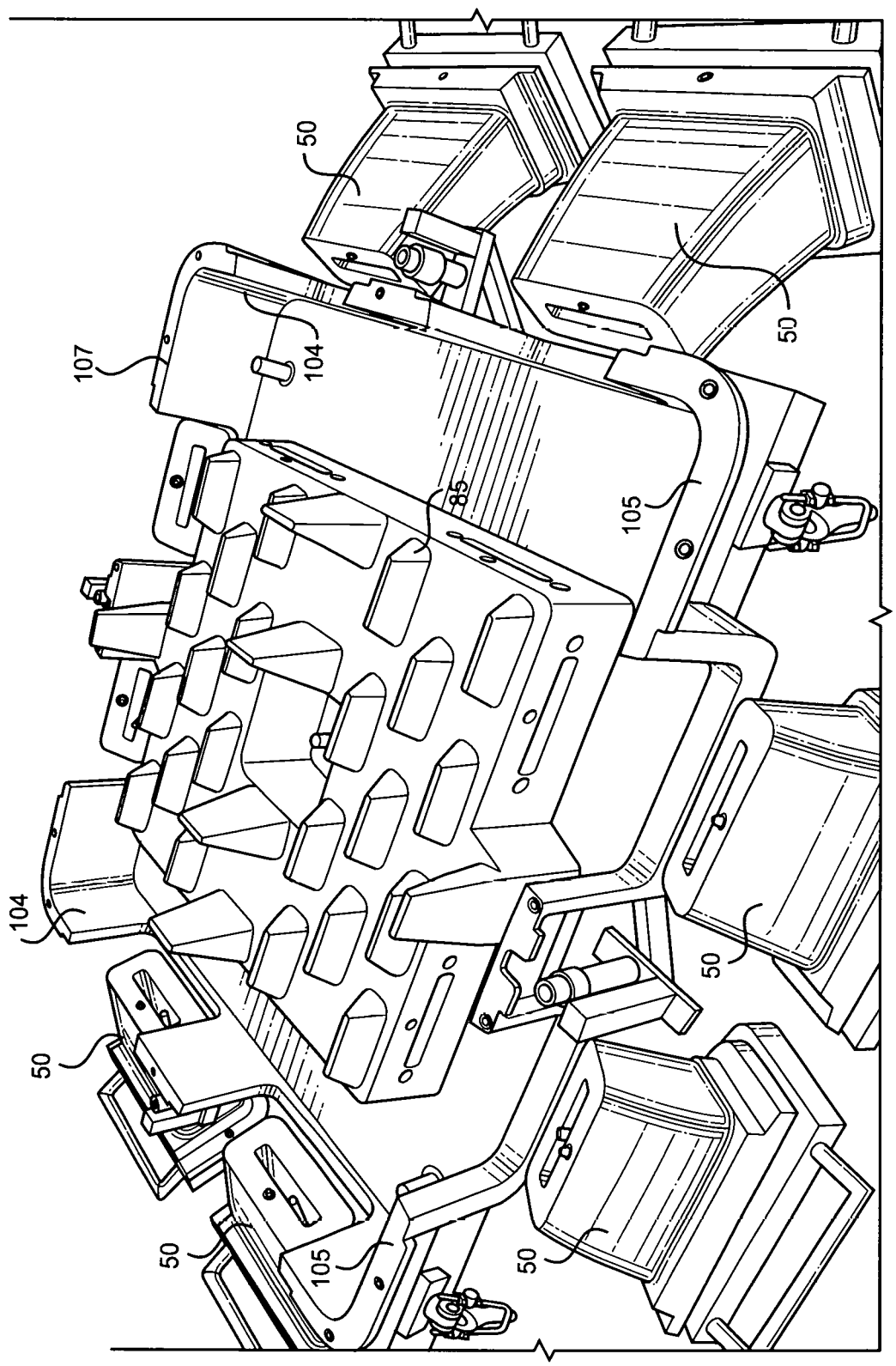
FIG. 12 is an overhead view of the mold in the frame
Figure 13:
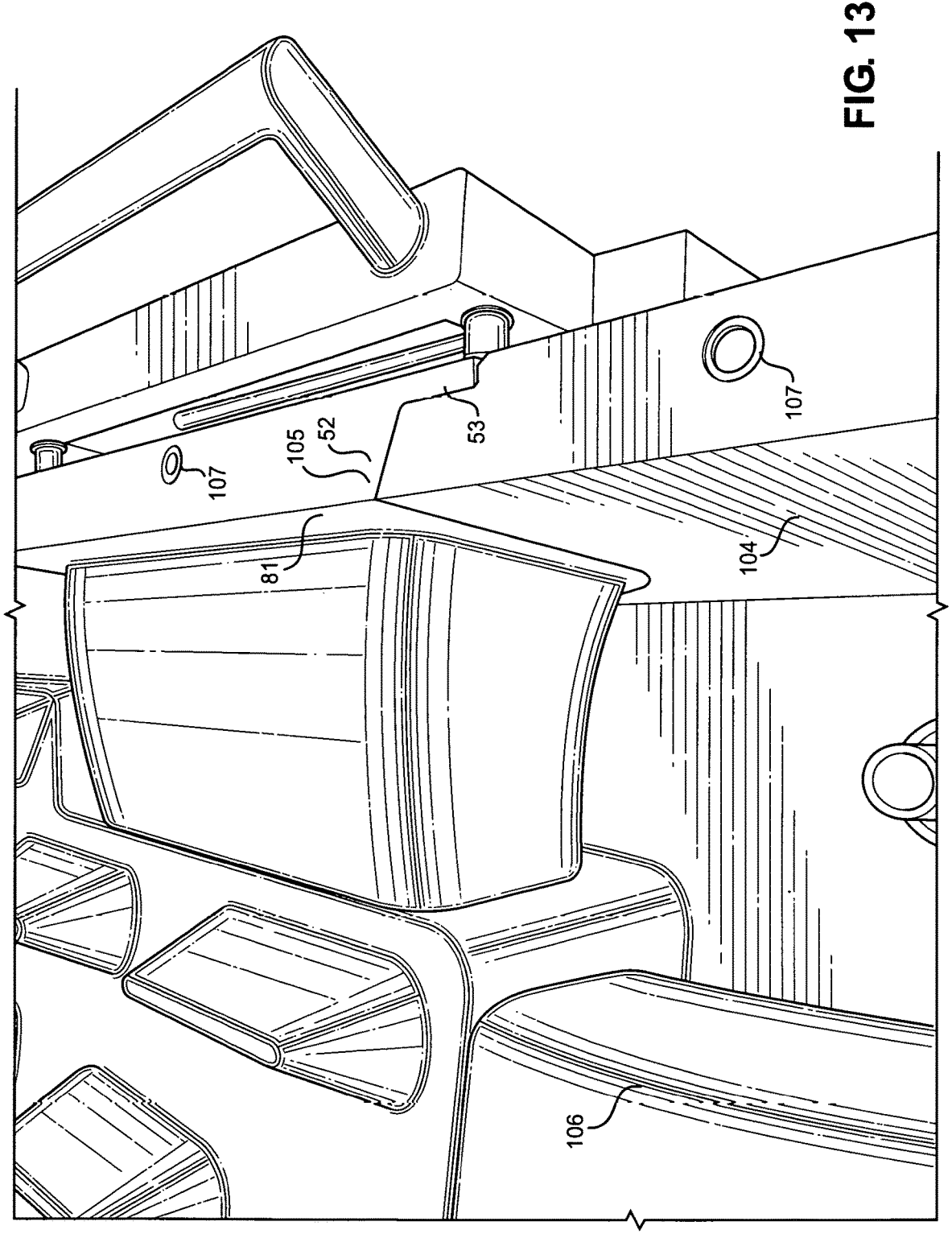
FIG. 13 is a perspective view showing the fit of the mold core base with the central mold for the pallet.
Figure 14:
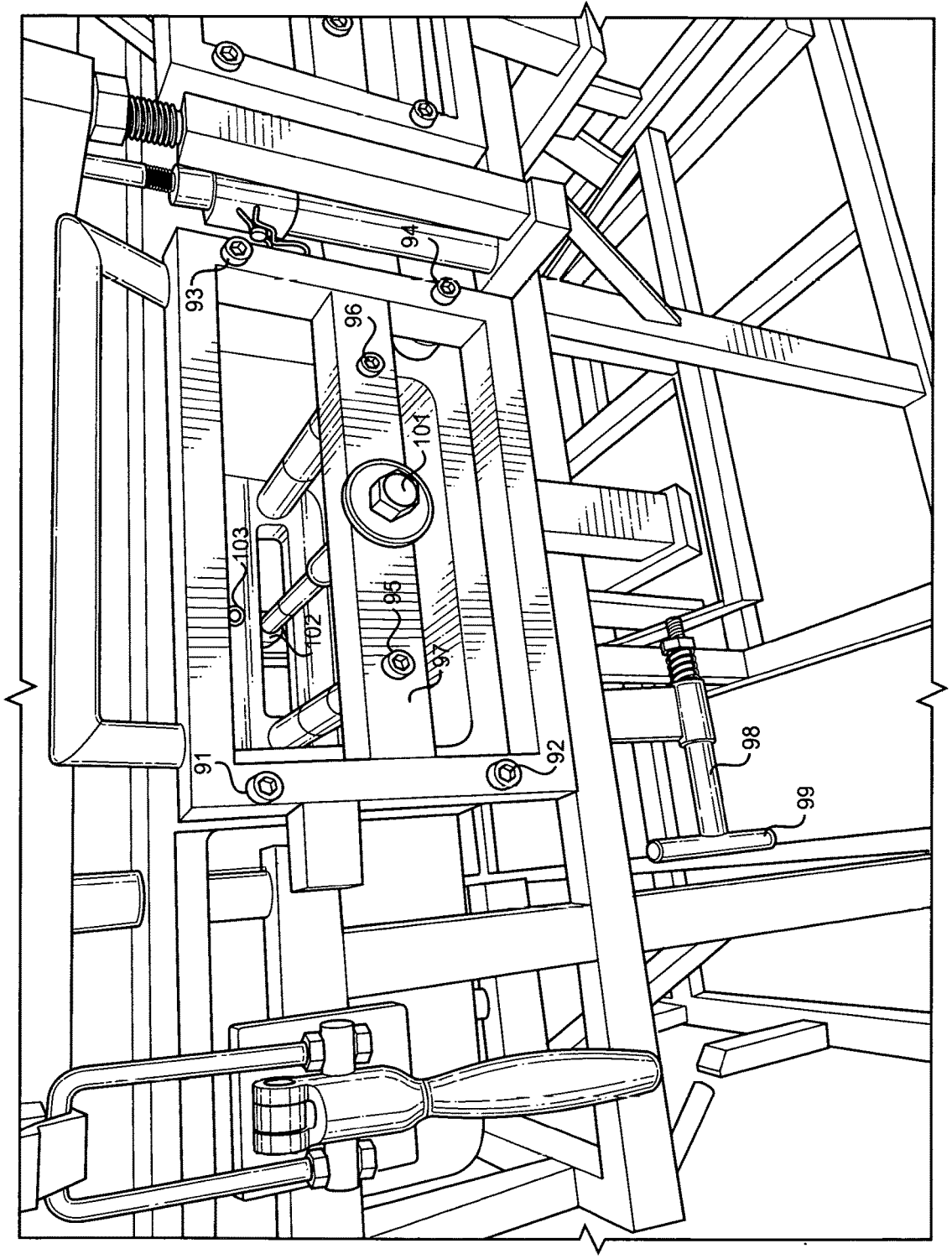
FIG. 14 is a front perspective view of the frame door as it is attached to the mold.
Figure 15:
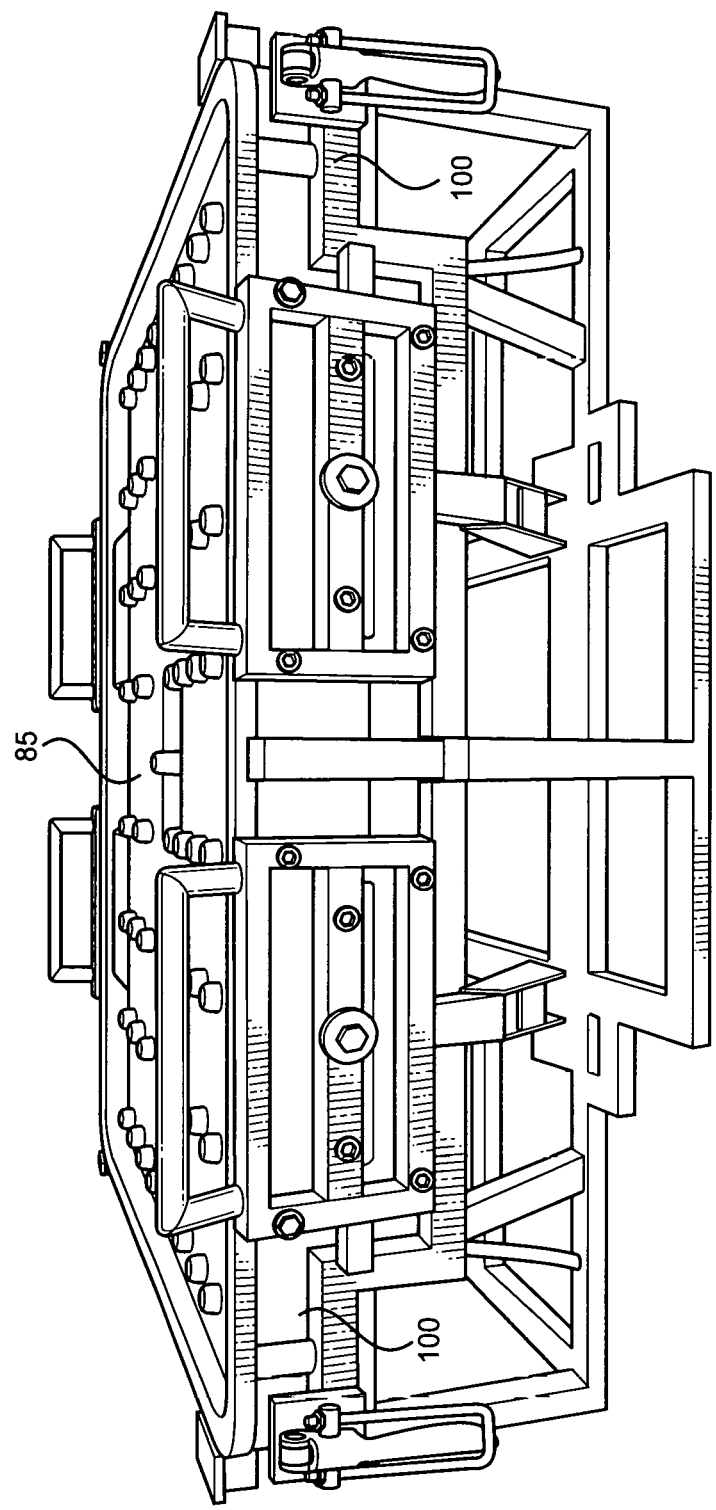
FIG. 15 is a side view of the frame doors in the closed position against the frame and the central mold.
Figure 16:
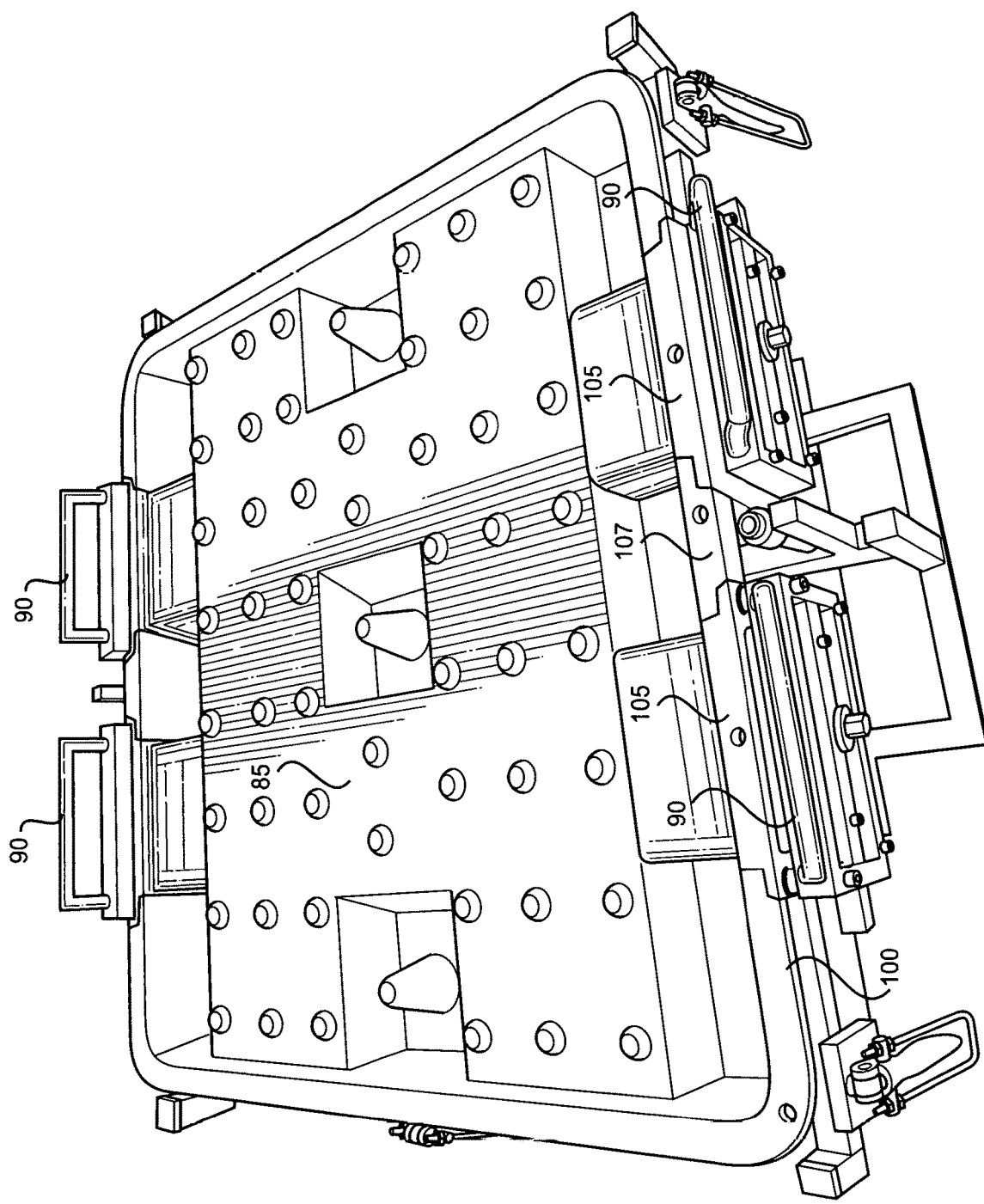
FIG. 16 is a perspective overview of one embodiment of the central mold.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION OF THE EMBODIMENT

The present disclosure is for a mold core that is used in a rotomold to form the openings 3, 4, 13, 14, 15, 16, 17, 18 of a pallet 5.

Integrally a molded pallet 5 has a top deck 7, and a bottom support section 12. The bottom support section 12 has four walls or sides 8, 9, 10, 11. On at least one of the sides, there are two openings 3, 4. In another embodiment, there are two openings 3, 4, 13, 14, 15, 16, 17, 18, on each side 8, 9, 10, 11 of molded pallet 5. In another embodiment, there are two openings on two opposing sides. There are four corner posts 19, 20, 21, 22. Furthermore, there is a bisecting post 23, 24, 25, 26, between the openings on each side 8, 9, 10, 11. Additionally, in another embodiment on an underside 27 of the pallet 5, there is an integrally molded support block 28, generally positioned in the middle of the 27 of the pallet 5. In yet another embodiment, there are further support blocks 29, 30 positioned integrally and behind two of the bisecting posts. In another embodiment, there are support blocks integrally molded and behind all of the bisecting posts (not shown).

For further strength, runners 32 33, 34, 35, 36, 37, 38, 39 are integrally molded above and as part of the rim, and are positioned in said openings 3, 4, 13, 14, 15, 16, 17, 18.

Hand operated pallet jacks 40 are used to move the pallets from one location to another. Because the pallet jack 40 has wheels that must go through the openings 3, 4, or 3, 4, 13, 14, 15, 16, 17, 18, it is advantageous that the runners 32, 33, 34, 35, 36, 37, 38, 39 of the rotomolded pallet be curved, so that the wheels 41, 42, are not going over a rectangular bump. In order for the runners to be molded in a curve, however, a particular mold core 50 is used to form the openings. The mold core 50 can be made out of aluminum, stainless steel, steel, or any other appropriate metal. It could even be made out of a resin. This mold core 50 has or is made up of, at its distal end, a base assembly 51. The base assembly 51 can have a base 52 and flange 53 which are connected to each other. The base 52 positions the core in the mold. In one embodiment, the base 52 and the flange 53 are integral to one another or cast together, or cast with the entire mold 50.

Referring now to the active part 57 of the mold 50, a bottom section or bottom side 54 of the mold core 50 is convexly curved and in one embodiment is integral with the base assembly 51 at its distal end. When the mold core is inserted into the open side 55 of the mold and when the liquid or powdered plastic is added and melted, the curved runners will form under the bottom side or section 54 of the mold core.

The mold core 50 also has two sides 55, 56 that are integral with the bottom section 54 and with the base assembly 51 and their ends. There is also a front side or face 82 to which the sides 55, 56 are attached at their proximal ends. In one embodiment, the active part of the mold is integral.

The active part 57 of the mold core 50 also has an upper section 58. This upper section 58 is connected to, and in one embodiment integral with the base assembly 51 at its distal end and to the top of sides 55, 56, at the sides 59, 60. This upper section 58 has a convex curve 73; however, this convex curve 73 is not in parallel with the convex (lower) curve 72 of the bottom section 54.

As the plastic work hardens, or strain hardens, the plastic shrinks around the mold. If curves 72 and 73 are parallel, then the shrinking plastic would grab the mold core 50 and make it difficult to remove from the molded object. Consequently, so that the mold core 50 does not get embedded or trapped in the openings 3, 4, 13, 14, 15, 16, 17, 18 by the hardened plastic, the upper curve 73 is oriented around a different center of rotation 71 than that of the center of rotation 70 of the convex (lower) curve 72, thereby creating a core geometry where the upper curve 73 and the lower curve 72 are not parallel. If the center of rotation of the upper curve 73 is outboard of the center of rotation of the lower curve 72, the two curves are divergent towards the base assembly 51. This geometry creates a "rotational draft."

Of course, the radius 74 of the convex curve 73 of the upper section 58 is longer than that of the radius 75 of the convex curve 72 of the bottom section 54. It should be noted that different customers for the pallet have different needs for different sized pallets, differently curved floors, etc., and consequently the radii and the center of rotation of the curves vary. It should be noted that in one embodiment, the height 76 of the proximal end or face 82 of the mold core 50 is less than the height 77 of the distal end 83 of the active part 57 of the mold 50.

The mold core 50 is inserted into a gap 78 in the central mold also known as the body of the mold 85, and the plastic is heated and distributed around the mold core 50. When it is time to remove the mold core 50, the mold core is rotated out of the now molded opening 3, 4, 13, 14, 15, 18, 17, 18. As the mold core is rotated out of molded opening, the upper section 58 with the convex curve 73 actually rotates away from the curve formed in the ceiling 79 of the opening, also known as the ceiling curve. This allows for easy removal of the mold core from the molded opening.

In one embodiment, the mold core 50 has a hollow pass through 81 extending laterally through the entire mold core, from the proximal end or face 82 of the mold core 50 out through the base assembly 51. This hollow pass through 81 allows for air flow or heat transfer along the length of the mold core 50. The width of the mold core surrounding said pass through ranges from about ½" to about 2".

The process begins by obtaining the central mold or the body of the mold 85. The central mold or body of the mold 85 is attached to or fitted into a main frame 100. Attached to the main frame are rotatable or pivotable frame doors 90. The frame doors 90 are connected to and pivot about by means of a pivot arm 120 which are attached to the main frame 100 by a hinge pin located at the center or rotation of the lower arc of the core. Cores are held in the open position for de-molding by a spring actuated locking pin 98. The locking pin 98 has a handle 99. A pivot arm lock 122 and a locking plate 121 provide support and control for the pivot arm 120.

In one embodiment, a base assembly 51 of the mold core 50 is attached to a frame door 90, with large screws or threaded bolts 91, 92, 93, 94. In the embodiment shown, the frame door is bolted to the flange 53. Furthermore, there can be at least two additional points of attachment 95, 96 of a middle cross bar 97 of the frame door 90 attaching the frame door 90 to the base assembly 51 of the mold core 50.

In another embodiment, a long bolt 101 centered through the frame doors 90 connects and secures the frame door 90 to a female threaded receptor 102 which is part of and secured to the main frame 100. Other smaller screws (for example screw 103) attach the base 51 or in one embodiment, the flange 53, directly to the main frame 100. In an alternative embodiment, the mold core 50 can be held in place by any other means known in the art, including clamps, shorter bolts, screws, etc.

Figure 17:
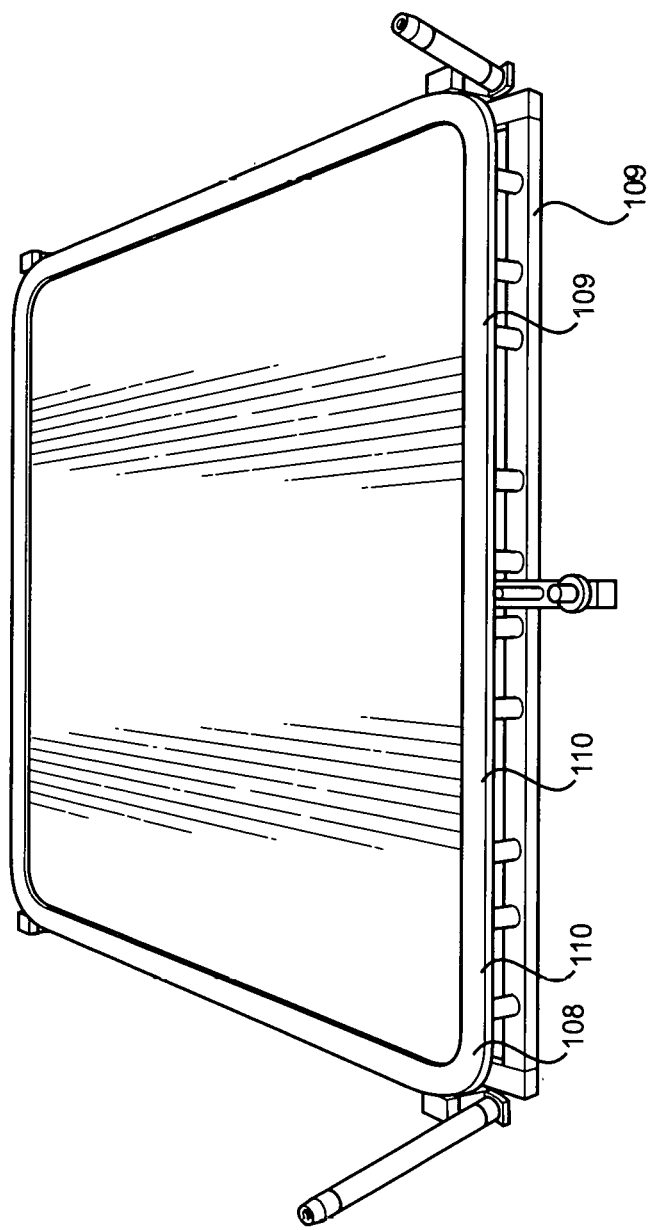
FIG. 17 is an overhead view of the lid of the frame of the mold.

The outer rim 104 of the central mold 85 has a door frame opening 103 and openings in the rim 104 which are filled when frame doors 90 containing the mold core 50 are closed. The top edge 105 of the base 81 and the door frame openings 103 complements and are filled by the base 81 while at the same time the active part of the mold core 57 is positioned against the central part 106 of the mold 85 There are a plurality of threaded holes 107 along the top of the edge 105. These holes 107 will be used to seal the mold lid 108 of the central mold 85 to the frame 100. More specifically, the mold lid 108, shown in FIG. 17, fits over the central mold 85. This mold lid 108 has a rim 109 with a plurality of holes 110 so that it can be attached and bolted down to the central mold 85. The lid 108 is supported by the upper frame 111.

Figure 18:
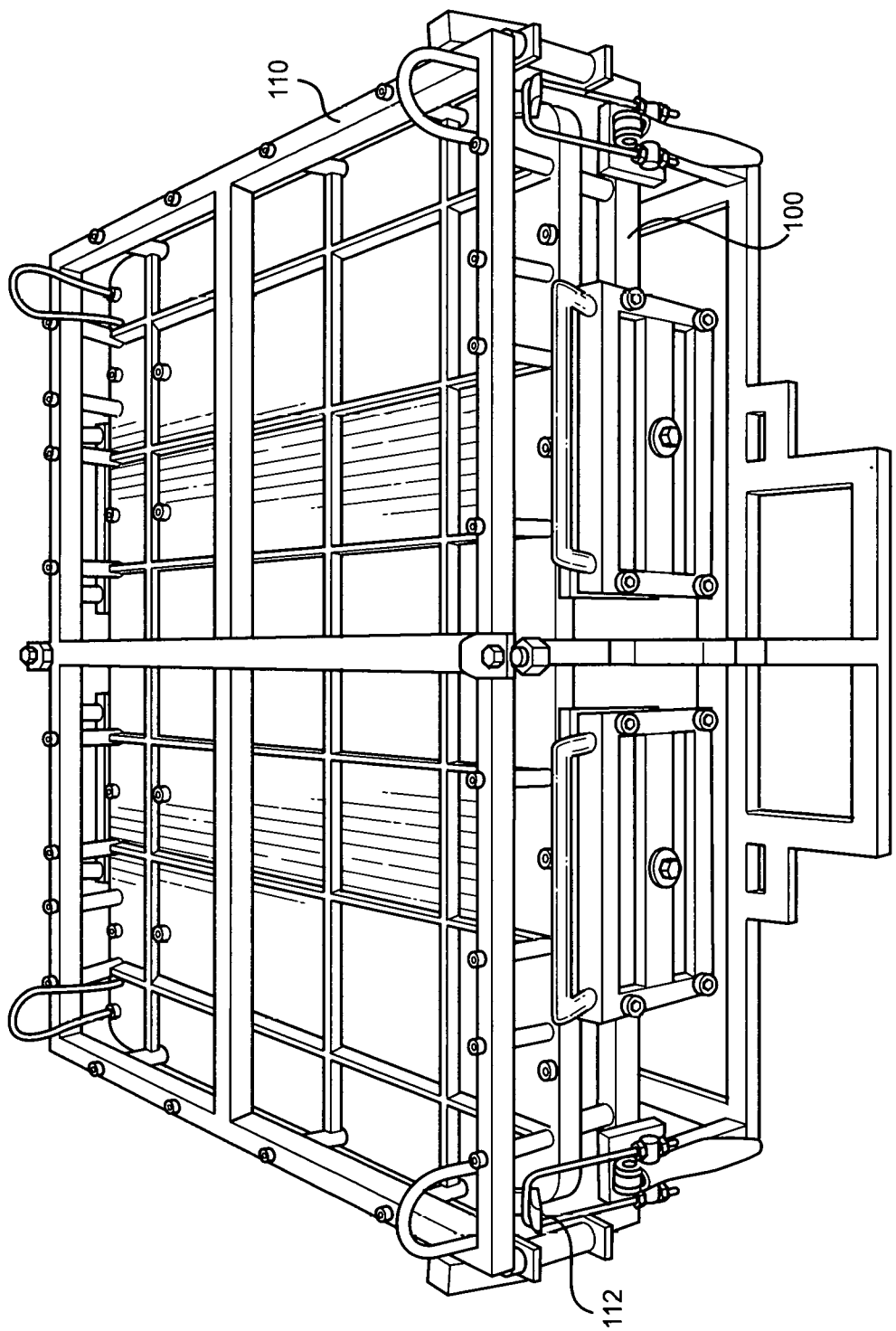
FIG. 18 is an overhead view of the frame locked and surrounding the mold.

As shown in FIG. 18, the lid is configured to attach to the central mold and the upper frame and the lower frame are attached. The holes 110 surrounding both the lid 108 and the threaded holes 107 along the top of the edge 105 can be used to attach and seal the mold and the lid or can be used to attach the upper frame 111 to the main frame while simultaneously securing the main mold 85. Latches 112 positioned at each corner of the further allow for a locking of the frame.

The plastic powder or liquid used to form the mold is added prior to locking up the frame, or is added through distinct openings that run into the mold. Once the plastic powder (usually PCV) is added, the frame is mounted into a rotomold which heats and rotates the mold in different axis so as to equally distributed the now melted plastic. Once the plastic begins to harden, it is cooled and removed from the frame for any further treatment such as trimming of excess plastic.

The mold core 50 can used in other molding processes, and not just for the creation of pallets.

What is claimed is:

1. A pallet said pallet comprising:
    a) a top deck;
    b) a bottom support section upon which said top deck is attached, said bottom platform comprising:
        i) a first side, said positioned integrally attached to and beneath a first edge of the top deck, said first side having a first side upper portion, said first side positioned between a first corner post and a second corner post;
        ii) a second side opposite said first side, said second side integrally attached to and beneath a second edge of the top deck, said second side having a second side upper portion, said second side positioned between said second corner post and a third corner post;
        iii) a third side positioned between said first side and said second side, said third side integrally attached to and beneath a third edge of the top deck, said third side having a third side upper portion, said third side positioned between said third corner post and a fourth corner post;
        iv) a fourth side positioned between said first side and said second side, opposite said third side, said fourth side integrally attached to and beneath a fourth edge of the top deck, said fourth side having fourth side upper portion, said fourth side position between said fourth corner post and said first corner post,
        each said side having a proximal side and a distal side
        v) at least one bisecting post bisecting of one said sides said at least one bisecting post creating a first opening and a second opening, said first and second openings each having
            1) a convexly curved runner, said runner convexly curved along its width; and
            2) concavely curved ceiling, said ceiling concavely curved along its width wherein the center point of the radius of the curved runner varies from the radius of the curved ceiling.

2. The pallet of claim 1, wherein a length of a diameter between a proximal end of the curved runner and a proximal end of curved ceiling is less than a length of a diameter between a distal end of the curved runner and a distal end of the curved ceiling.

3. The pallet of claim 2, wherein each of said four sides has a bisecting post creating said first and second openings on each side, with each said opening having a curved skid and a curved ceiling.

4. He pallet of claim 2, further comprising an underside of the pallet.

5. The pallet of claim 1, further comprising a rim positioned over a perimeter of an underside of the pallet.

6. The pallet of claim 5, further comprising a support block integrally molded in a middle of the underside of the pallet.

\* \* \* \* \*